(12) United States Patent
Chrabascz et al.

(10) Patent No.: US 9,261,101 B2
(45) Date of Patent: Feb. 16, 2016

(54) FAN HOUSING FOR RAM AIR FAN

(71) Applicant: Hamilton Sundstrand Corporation, Windsor Locks, CT (US)

(72) Inventors: Eric Chrabascz, Lognmeadow, MA (US); Victoria S. Richardson, Hartford, CT (US); Brent J. Merritt, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 716 days.

(21) Appl. No.: 13/664,509

(22) Filed: Oct. 31, 2012

(65) Prior Publication Data

US 2014/0119908 A1    May 1, 2014

(51) Int. Cl.
*F04D 19/00* (2006.01)
*F04D 25/06* (2006.01)
*F04D 29/52* (2006.01)
*B64D 13/00* (2006.01)

(52) U.S. Cl.
CPC ............ *F04D 25/0606* (2013.01); *F04D 19/00* (2013.01); *F04D 29/522* (2013.01); *B64D 13/00* (2013.01); *Y10T 29/49238* (2015.01)

(58) Field of Classification Search
CPC ... F04D 29/522; F04D 29/526; F04D 25/002; F04D 19/002; B64D 13/00
USPC ............................................................. 415/9
See application file for complete search history.

(56) References Cited

U.S. PATENT DOCUMENTS

| | | | |
|---|---|---|---|
| 3,970,252 A * | 7/1976 | Smale et al. | 239/127.3 |
| 5,031,513 A * | 7/1991 | Cohen | 454/70 |
| 5,205,513 A * | 4/1993 | Schilling | 244/54 |
| 6,236,184 B1 | 5/2001 | Baker | |
| 6,735,936 B2 * | 5/2004 | Rey et al. | 60/226.3 |
| 6,928,963 B2 | 8/2005 | Karanik | |
| 7,322,207 B2 | 1/2008 | Kikuchi et al. | |
| 7,402,020 B2 | 7/2008 | Beers et al. | |
| 7,497,627 B2 | 3/2009 | Saville et al. | |
| 7,633,193 B2 | 12/2009 | Masoudipour et al. | |
| 7,695,355 B2 | 4/2010 | Doherty | |
| 7,757,502 B2 | 7/2010 | Merritt et al. | |
| 2004/0261428 A1 | 12/2004 | Murry et al. | |
| 2007/0241257 A1 * | 10/2007 | Eleftheriou et al. | 248/554 |

* cited by examiner

*Primary Examiner* — Igor Kershteyn
*Assistant Examiner* — Woody A Lee, Jr.
(74) *Attorney, Agent, or Firm* — Carlson, Gaskey & Olds, PC

(57) ABSTRACT

A fan housing has a radially outer surface. A pair of radially intermediate surfaces includes a first surface spaced towards a first axial end, which has an inner bore positioned radially outward of an inner bore of a second surface. Vanes extend between the radially outer surface and an outer periphery of the pair of radially intermediate surfaces. A bearing bore extends radially inwardly of the first surface. A mounting lug nub is formed on an outer periphery of the radially outer surface. A first distance is defined between the first axial one end of the fan housing and an opposed axial end. A second distance is defined between the first axial end and a center of the mounting lug. A ratio of the first distance to the second distance is between 2.13 and 2.11. An intermediate part, a ram air fan and a method are also disclosed.

11 Claims, 3 Drawing Sheets

FAN HOUSING FOR RAM AIR FAN

BACKGROUND

This application relates to a fan housing for use in a ram air fan.

Ram air fans are known, and are utilized in aircraft applications as a source of air, such as for an aircraft cabin air cooling system. Generally, a ram air fan includes a fan impeller received within a housing, that is mounted on an aircraft in a location where it may be exposed to air during flight of an aircraft. The fan is provided with an electric motor, which drives the impeller to supply cooling air.

A fan housing typically supports the fan rotor, and includes a number of static vanes. In the past, the fan housing was a relatively elongate structure, extending from a location adjacent an intermediate portion of the motor up to a forward location for the entire ram air fan, axially beyond the impeller. Such fan housings typically had manufacturing lugs which were positioned forwardly on the relatively long fan housing.

For any number of reasons, splitting the fan housing into two pieces is desirable.

SUMMARY

A fan housing has a radially outer surface, and a pair of radially intermediate surfaces spaced inwardly from the radially outer surface. An inner periphery of the pair of radially intermediate surfaces includes a first surface spaced towards a first axial end of the fan housing which has an inner bore positioned radially outward of an inner bore of a second surface. Vanes extend between the radially outer surface and an outer periphery of the pair of radially intermediate surfaces. A bearing bore extends radially inwardly of the first surface. A mounting lug nub is formed on an outer periphery of the radially outer surface. A first distance is defined between the first axial end of the fan housing and an opposed axial end. A second distance is defined between the first axial end and a center of the mounting lug. A ratio of the first distance to the second distance is between 2.13 and 2.11. An intermediate part, a ram air fan and a method are also disclosed.

These and other features of this application will be best understood from the following specification and drawings, the following of which is a brief description.

DETAILED DESCRIPTION

Figure 1:
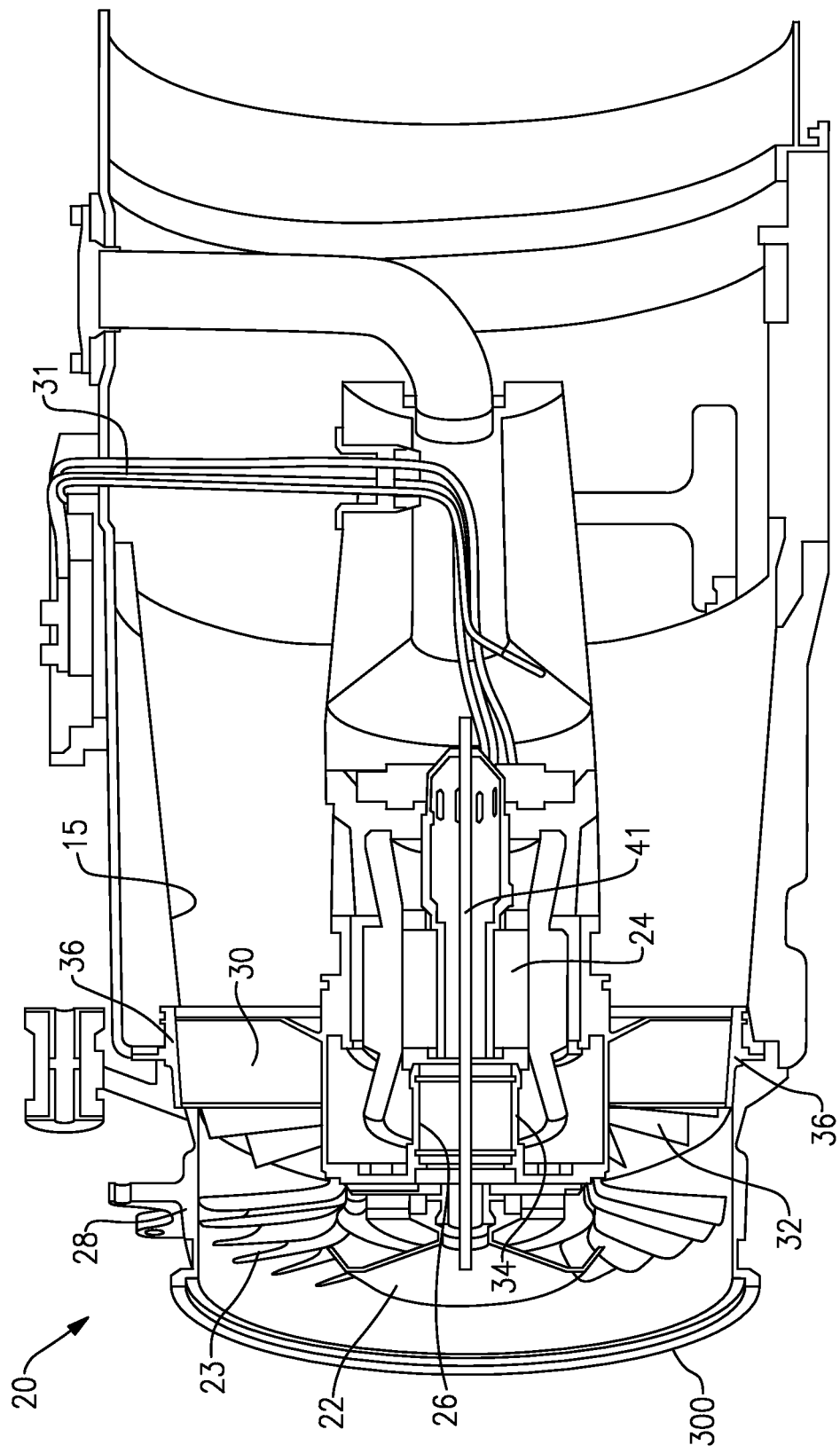
FIG. 1 shows a ram air fan.

A ram air fan 20 is illustrated in FIG. 1. As known, an impeller 22 carries fan blades 23, and is associated with a motor 24. The motor 24 may be driven from a source of power 31 to drive the impeller 22 through a shaft 41.

A forward housing 28 extends from a forward end 300 of the ram air fan 20 rearwardly, and surrounds a second fan housing 30. Second fan housing 30 carries a plurality of blades 32, and extends to a radially outer portion 36 received radially inwardly of the housing portion 28. A bearing bore 34 supports a bearing surrounding a shaft 41.

Figure 2:
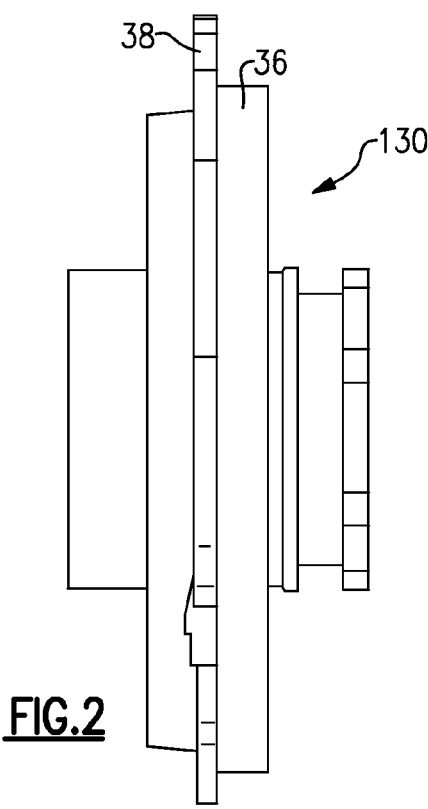
FIG. 2 is a side view of a fan housing.
Figure 3:
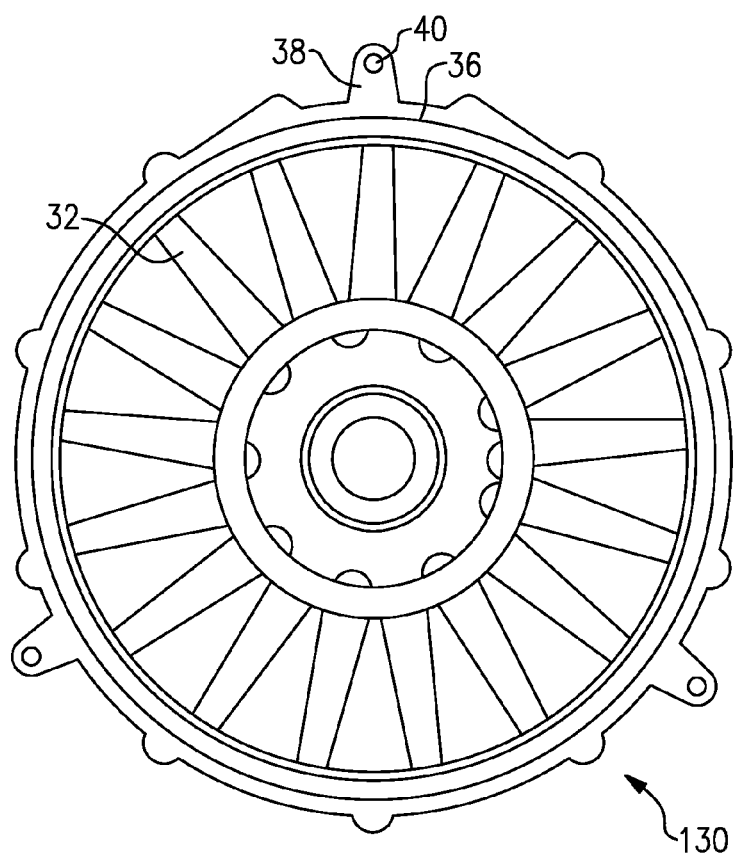
FIG. 3 is a front view of a fan housing.

As shown in FIG. 2, an intermediate fan housing 130 includes an outer surface 36 having a plurality of mounting lugs 38. As can be seen in FIG. 3, the mounting lugs 38 have holes 40.

Figure 4:
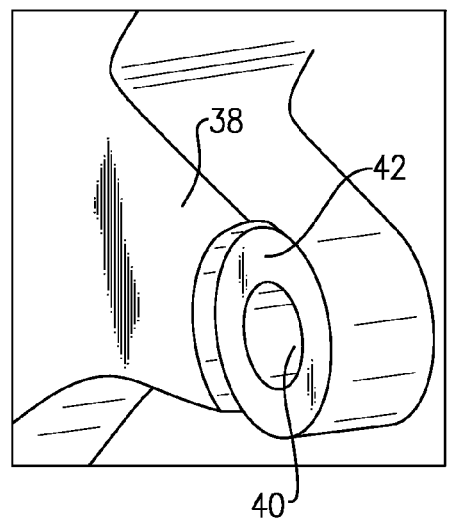
FIG. 4 shows a single detail on the fan housing.

FIG. 4 shows a detail of the mounting lug 38, and the hole 40. As shown, a counter sink 42 is formed around the hole 40.

Figure 5:
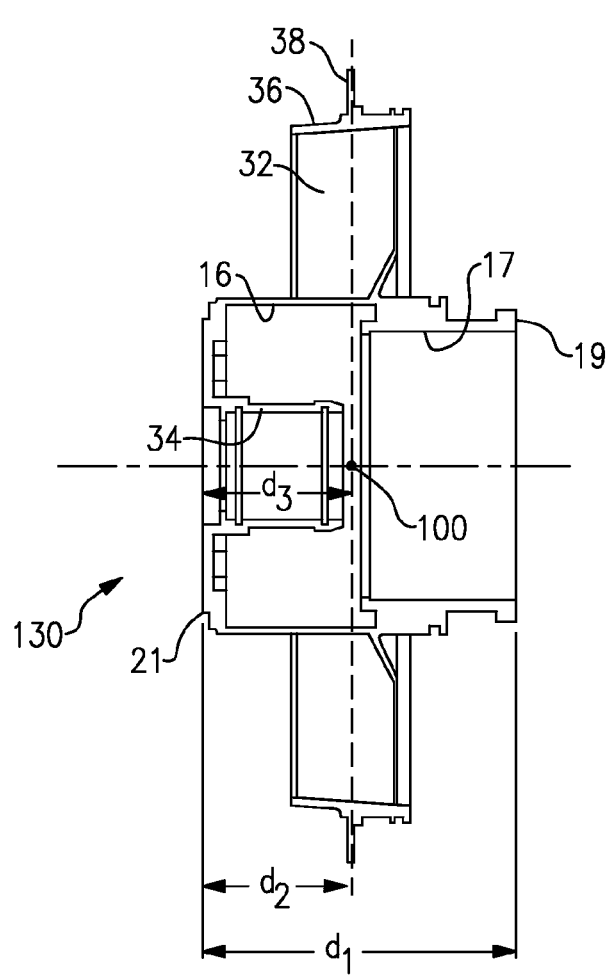
FIG. 5 is a cross-sectional view through the fan housing.

FIG. 5 is a cross sectional view through the intermediate fan housing 130. As shown, a forward face, or first axial end 21 has the bearing bore 34 extending inwardly, and inward of a first radial surface 16. The vanes 32 extend radially outwardly from the surface 16. A second surface 17 is rearward of the surface 16 and positioned slightly radially inwardly of surface 16. The surfaces 16 and 17 are intermediate the bore 34 and radially outer surface 36. An end 19 is defined at the other end of the surface 17. Vanes 32 also extend from the outer periphery of surface 17.

As shown in FIG. 5, a first dimension $d_1$ is the length between the ends 21 and 19. A second length $d_2$ is the length between a center of the mounting lug 38, and the forward end 21. In one embodiment $d_1$ was 6.060 in (15.3 cm) and $d_2$ was 2.858 in (7.259 cm). In an embodiment, a ratio of $d_1$ to $d_2$ is between 2.13 and 2.11.

As also shown, a center of gravity 100 exists within the fan housing 30. A length $d_3$ is defined between the forward end 21 and the axial position of the center of gravity 100. In embodiments a ratio of $d_2$ to $d_3$ was between 1.07 and 1.00.

In general, the location of the mounting lug 38 is positioned much closer to the center of gravity 100 than it has been in the past. This facilitates the manufacture of the fan housing 30, as will be explained below.

Figure 6A:
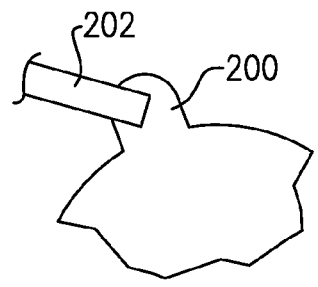
FIG. 6A shows a first step in the manufacturing of the fan housing.
Figure 6B:
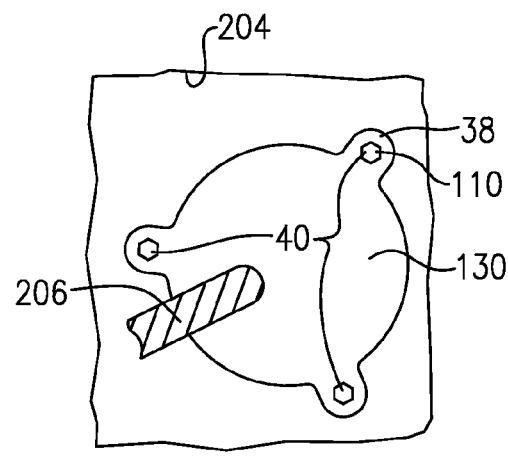
FIG. 6B shows a subsequent step.

As shown in FIG. 6A, the intermediate fan housing 30 is formed from an aluminum casting 132, and may be C355 aluminum. The casting has what will be the mounting lugs 38 formed as an intermediate ear 200. A machine 202 then machines in the counter sink 42 and holes 40. Once the holes and counter sink are formed, the intermediate casting 130 may be placed on a fixture 204 as shown in FIG. 6B. The fixture 204 has pins 110 which are received within the holes 40 to properly position the intermediate fan housing 130. Additional machining, such as lathing and milling may occur as shown schematically by tool 206.

Figure 6C:
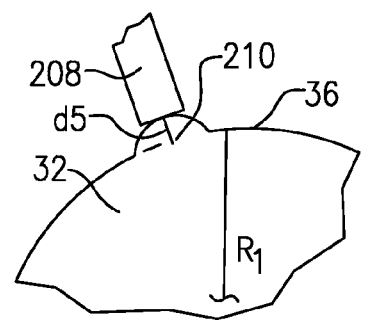
FIG. 6C shows yet another subsequent step.

Finally, as shown in FIG. 6C, the mounting lugs are removed down to a nub 210 as shown schematically by a tool 208. Since the lugs 38 are almost at the center of gravity, the intermediate fan housing 130 is better supported for these operations.

The final fan housing 30, as will be mounted within the ram air fan 20 as shown in FIG. 1 does not have the full mounting lug, but rather just a nub 210. In one embodiment, the nub extended radially outwardly of the outer surface 36 by a radial distance $d_5$. In one embodiment, $d_5$ was 0.08 in (0.20 cm). In this embodiment, the surface 36 was at a radius R1, of 7.46 in (18.9 cm). In embodiments, a ratio of the radial height of the nub 210 above the surface 36 to R1 was between 0.017 and 0.003.

The use of the mounting lugs which are tightly controlled to be approximately at the center of gravity of the casting improves the machining of the fan housing 30.

A method of repairing a ram air fan comprises removing a fan housing 32 from a ram air fan 20. The fan housing includes a bearing bore 34 for supporting a bearing on a shaft 41. Removed fan housing 32 is replaced with a new fan housing 32.

The new fan housing 32 has a radially outer surface 36 and a pair of radially intermediate surfaces 16 and 17 spaced radially inwardly from the radially outer surface. An inner periphery of the pair of radially intermediate surfaces includes a first surface 16 spaced towards a first axial end 21 of the fan housing, which has an inner bore positioned radially outward of an inner bore of a second surface 17. Vanes 32 extend between the radially outer surface 36 and an outer periphery of the pair of radially intermediate surfaces 16 and 17. A bearing bore 34 extends radially inwardly of the first surface 16.

A mounting lug 38 is formed on an outer periphery of the radially outer surface 36. A first distance $d_1$ is defined between the first axial end 21 and an opposed axial end 19. A second distance $d_2$ is defined between the first axial end 11 and a center of the mounting lug 38. A ratio of the first distance to the second distance is between 2.13 and 2.11.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fan housing comprising:
    a radially outer surface and a pair of radially intermediate features spaced radially inwardly from said radially outer surface, one of said pair of radially intermediate features including a first inner surface spaced towards a first axial end of said fan housing, said first inner surface having an inner bore positioned radially outward of an inner bore of a second inner surface defined by the other of said pair of radially intermediate features, a plurality of vanes extending between said radially outer surface and an outer periphery of each of said pair of radially intermediate features;
    a bearing bore extending radially inwardly of said first surface;
    a mounting lug nub formed on an outer periphery of said radially outer surface, a first distance defined between said first axial end of said housing and an opposed axial end, and a second distance defined between said first axial end and an axial center of said mounting lug nub, and a ratio of said first distance to said second distance being between 2.13 and 2.11; and
    a center of gravity existing for said fan housing, and there being a third distance from said first axial end of said fan housing to an axial position of said center of gravity, and a ratio of said second distance to said third distance being between 1.07 and 1.00.

2. The fan housing as set forth in claim 1, wherein said mounting lug nub extending radially outward of said outer surface of said radially outer surface for a forth distance, and said outer periphery of said radially outer surface being spaced from a center axis of said fan housing by a first radius, and a ratio of said fourth distance to said first radius being between 0.017 and 0.003.

3. The fan housing as set forth in claim 1, wherein said bearing extending from said first axial end and towards said opposed axial end.

4. An intermediate part comprising:
    a radially outer surface and a pair of radially intermediate features spaced radially inwardly from said radially outer surface, one of said pair of radially intermediate features including a first inner surface spaced towards a first axial end of said fan housing, said first inner surface having an inner bore positioned radially outward of an inner bore of a second inner surface defined by the other of said pair of radially intermediate features, a plurality of vanes extending between said radially outer surface and an outer periphery of each of said pair of radially intermediate features;
    a bearing bore extends extending inwardly of said first surface;
    a mounting lug nub formed on an outer periphery of said radially outer surface, a first distance defined between said first axial end of said housing and an opposed axial end, and a second distance defined between said first axial end and am axial center of said mounting lug nub, and a ratio of said first distance to said second distance being between 2.13 and 2.11; and
    a center of gravity existing for said fan housing, and there being a third distance from said first axial end of said fan housing to an axial position of said center of gravity, and a ratio of said second distance to said third distance being between 1.07 and 1.00.

5. The intermediate part as set forth in claim 4, wherein said bearing extending from said first axial end and towards said opposed axial end.

6. A ram air fan comprising:
    a ram air fan including a motor connected to rotate with a shaft, said shaft connected to rotate with an impeller;
    a fan housing with a radially outer surface and a pair of radially intermediate features spaced radially inwardly from said radially outer surface, one of said pair of radially intermediate features including a first surface spaced towards a first axial end of said fan housing, said first inner surface having an inner bore positioned radially outward of an inner bore of a second inner surface defined by the other of said pair of radially intermediate features, a plurality of vanes extending between said radially outer surface and an outer periphery of each of said pair of radially intermediate features, a bearing bore extending radially inwardly of said first surface, the bearing bore supporting a bearing for said shaft, a mounting lug nub formed on an outer periphery of said radially outer surface, a first distance defined between said first axial end of said housing and an opposed axial end, and a second distance defined between said first axial end and an axial center of said mounting lug nub, and a ratio of said first distance to said second distance being between 2.13 and 2.11; and
    a center of gravity exists for said fan housing, and there being a third distance from said first axial end of said fan housing to an axial position of said center of gravity, and a ratio of said second distance to said third distance being between 1.07 and 1.00.

7. The ram air fan as set forth in claim 6, wherein said mounting lug nub extending radially outward of said outer surface of said radially outer surface for a forth distance, and said outer periphery of said radially outer surface being spaced from a center axis of said fan housing by a first radius, and a ratio of said fourth distance to said first radius being between 0.017 and 0.003.

8. The ram air fan of claim 6, wherein said bearing extending from said first axial end and towards said opposed axial end.

9. A method of repairing a ram air fan comprising the steps of:
    removing a fan housing from a ram air fan, said fan housing including a bearing bore for supporting a bearing on a shaft;
    replacing said removed fan housing with a new fan housing;

the new fan housing having a radially outer surface and a pair of radially intermediate features spaced radially inwardly from said radially outer surface, one of said pair of radially intermediate features including a first inner surface spaced towards a first axial end of said fan housing, said first inner surface having an inner bore positioned radially outward of an inner bore of a second inner surface defined by the other of said pair of radially intermediate features, a plurality of vanes extending between said radially outer surface and an outer periphery of each of said pair of radially intermediate features;

a bearing bore extending radially inwardly of said first surface;

a mounting lug nub formed on an outer periphery of said radially outer surface, a first distance defined between said first axial end of said housing and an opposed axial end, and a second distance defined between said first axial end and an axial center of said mounting lug nub, and a ratio of said first distance to said second distance being between 2.13 and 2.11; and a center of gravity exists for said fan housing, and there being a third distance from said first axial end of said fan housing to an axial position of said center of gravity, and a ratio of said second distance to said third distance being between 1.07 and 1.00.

10. The method as set forth in claim 9, wherein said mounting lug nub extending radially outward of said outer surface of said radially outer surface for a fourth distance, and said outer periphery of said radially outer surface being spaced from a center axis of said fan housing by a first radius, and a ratio of said fourth distance to said first radius being between 0.017 and 0.003.

11. The method of claim 9, wherein said bearing extending from said first axial end and towards said opposed axial end.

* * * * *